Patented May 13, 1952

2,596,844

UNITED STATES PATENT OFFICE 2,596,844

TREATMENT OF WELLS

Joseph B. Clark, Tulsa, Okla., assignor to Stanolind Oil and Gas Company, Tulsa, Okla., a corporation of Delaware No Drawing. Application December 31, 1949, Serial No. 136,394

23 Claims. (Cl. 166—21)

This invention pertains to the treatment of oil and gas wells. More particularly, this invention pertains to a method of increasing the productivity of an oil or gas well by providing lateral drainage channels in selected formations adjacent a well. This application is a continuation-in-part of my application Serial Number 29,932, filed May 28, 1948.

In the art of increasing the productivity of oil and gas wells, various methods have been proposed for increasing the drainage area within a selected producing zone. For example, nitroglycerin is detonated in a well in some cases either to enlarge the well diameter or fracture the formations immediately adjacent a well. The use of nitroglycerin in this art is, however, restricted in many cases, due to the presence of pipe in the hole, the expense, the hazards, etc. Horizontal drilling is likewise employed to increase the surface area of a well in a selected zone. The increased productivity, however, is rarely commensurate with the increased cost. Furthermore, both of these processes are further limited by their inability when used in ordinary-diameter oil or gas wells to extend the drainage channels an appreciable distance into the selected zone. Acidizing is sometimes practiced to increase the permeability of the formations adjacent a well, but this process is generally limited to use in calcareous formations.

Accordingly, it is an object of this invention to provide an improved method of completing wells. Another object of this invention is to provide an improved composition for fracturing producing formations. A more specific object of this invention is to provide a method of fracturing a formation penetrated by a well by injecting a gelled oily liquid into the formation and subsequently reducing the viscosity of this gelled liquid by breaking the gel in situ in the formation, whereby a permeable channel is produced in the formation to conduct fluids from the formation into the well. Still another object of this invention is to provide an improved fracturing liquid for deep earth formations, the liquid containing a bodying agent and initially, due to the bodying agent, having a considerably retarded tendency to filter through the formations but eventually having an increased tendency to filter through the formations to avoid permanently plugging the flow channels from the formation into the well.

In the present invention, which is directed generally to the art of producing permeable channels from oil or gas wells to remote points in a formation, certain soaps are added to the oily fracturing liquid to body or gel the oily liquid and produce a highly desirable, low-penetrating liquid. These channels are created by application of hydrostatic pressure to these low-penetrating oily liquids (as hereinafter defined) sufficient to produce a crack or fracture in a formation. To produce such a fracture, I first place the low-penetrating liquid in the well opposite the zone to be fractured. Pressure is then applied to the liquid; and, due to its retarded tendency to filter through the formations, a pressure is built up in the well sufficient to produce a fracture, generally along a bedding plane where the tensile strength of stratified rock is weakest. The invention is, however, not limited to fracturing formations along a horizontal plane for occasionally, especially in non-stratified formations, the formation appears to fracture along a vertical plane. In any case, the low-penetrating liquid is pumped into the well at a rate which causes the pressure to rise to the point that a fracture occurs. This formation breakdown pressure is recognized generally by a sharp break or leveling-off in pressure after which the liquid may be injected into the formation crevice at high rate without a substantial increase in pressure. This body of gelled low-penetrating liquid in the fracture, having a tendency to retard flow of the interstitial or formation fluids from the formations through the fracture, is removed by the addition of a gel breaker or peptizer and by producing the well.

It has been proved in the laboratory that when a fracture is created in a relatively impermeable core and the fracture is then closed, the permeability of the core is substantially increased. Laboratory data have been corroborated in wells where it has also been proved that the permeability may be further increased by the introduction of formation props or spacer materials such as sand, crushed shell, small metal objects, or the like with the low-penetrating liquid or the peptizer. Preferably, however, I place the props or spacer objects in the low-penetrating, oily liquid which is better adapted, by a higher viscosity and gel strength, to support the props and carry them into the fracture.

As used in this application, "low-penetrating oily liquid" is defined as an oily liquid or a liquid miscible with the formation oil which, with respect to the natural fluids in the well, such as water or crude oil, has a considerably retarded tendency to filter through the formations. Well fluids have a viscosity usually less than about 10 centipoises, frequently 1 to 2 centipoises, with lower values at formation temperatures. A low-penetrating oily liquid has a viscosity in the range of from about 30 centipoises to about 5,000 centipoises or higher, for example, 75 to several hundred centipoises is preferred. Liquids having higher viscosities can be employed, but their pumpability is lowered, increasing handling difficulties.

While viscosity is in the case of Newtonian liquids or simple liquid suspensions (liquids in which the rate of shear is directly proportional to the shear stress) indicative of the formation-penetrating qualities, the filter rate is another measure of such qualities and is applicable to fluid suspensions of solids or fluids containing plastering agents. Filtrate rate is customarily defined as the volume of liquid collected in a unit time (normally 30 minutes) when a measured sample of liquid is placed in a cylinder closed at the bottom by a supported filter paper and a gas pressure is placed on this liquid. The sample is usually 600 cc., gas pressure 100 p. s. i., and Whatman No. 50 or 52 filter paper is used. A fluid loss of 100 cc. or less, preferably 50 cc. or less in 30 minutes, is desirable. The filtrate rate of oil field brines and crude oils is usually so great that measurements at 30 minutes are meaningless. Accordingly, the filtrate rate in such cases is determined by the "dehydration time," where this is defined as the time required for air to blow through the cylinder and filter paper when 600 cc. of the liquid are placed in the cylinder at the start of the filtrate-rate test and a pressure of 100 p. s. i. is applied to the surface of the fluid. The "dehydration time" of ordinary crude oils and oil field brines under formation conditions is of the order of 15–30 seconds. A low-penetrating oily liquid is defined under the same conditions as a fluid having a "dehydration time" of at least 1.5 minutes, and preferably at least 3 minutes or more. The filtration apparatus and procedure is described in A. P. I. Code No. 29, second edition, July 1942 (tentative). Usually this "dehydration time" of low-penetrating oily liquid will be too long to measure.

I employ as a viscous oily liquid preferably a higher alcohol, a crude oil, a refined oil such as gasoline, kerosene, naphtha, fuel oil, diesel oil, aromatic hydrocarbons, an animal oil such as lard oil or fish oil, a vegetable oil such as cottonseed oil, chlorinated hydrocarbons, or the like containing gelling agents, i. e., an agent which tends to thicken a liquid and thereby reduce substantially its filtrate rate as, for example, a high molecular weight linear molecule or polymer, such as salts of the fatty acids, which are at least partially oil soluble or dispersable. Soaps, produced by or from aluminum, combined with a fatty acid, produce suitable bodying agents for the lighter oily liquids. Heating (for example to about 200°–260° F.) to increase solvation, or adding separately under agitation first the fatty acid and then the metal as the hydroxide, can be employed. The fatty acid is preferably one of the aliphatic acids carrying at least one carboxyl group in aliphatic chain linkage, the aliphatic chain in either case having preferably at least 12 carbon atoms in said chain. Suitable fatty acid compounds which are available commercially are, for example, cocoanut oil fatty acids, peanut oil fatty acids, palm oil fatty acids, stearic acid, oleic acid, palmitic acid, and the like.

While the salts of fatty acids are, in general, suitable bodying agents for producing a suitable viscosity in the hydrocarbon, I prefer to employ an aluminum soap bodying agent, preferably a hydroxy aluminum soap, which has the ability to form hydrocarbon gels at ordinary temperatures. Examples of hydroxy aluminum soap bodying agents are set forth in U. S. 2,390,609, which is entitled "Bodying Agent for Liquid Hydrocarbons" and which describes specific methods of preparing certain of such hydroxy aluminum soaps. The term "hydroxy aluminum soap" as employed herein is intended to mean a soap wherein the hydroxy group or groups is attached to the aluminum component of the soap rather than being a component of the fatty acid. A suitable soap of this type, as pointed out in an article entitled "Napalm" in Industrial and Engineering Chemistry, vol. 38, No. 8 (August 1946), at pages 768–773, can be considered as compounded from two distinctive components. One is an aluminum laurate or a saturated fatty acid soap containing at least 40–50% of this substance or of a functionally related acid soap; this component is a relatively high-melting solid that, by itself, produces only thin and unstable gels. The second component is an aluminum soap or soaps selected from the group including cycloparaffinic and unsaturated acids—that is, an aluminum naphthenate, oleate, oleate-linoleate, etc. The combination of an aluminum soap of the laurate type with one or more soaps of the naphthenate-oleate type give a thickening agent of distinctive and superior properties not found in either component and when prepared by the precipitation process, the soap is a solid of sufficiently high softening point to withstand elevated drying and storage temperatures. I have found that at about 75° F., for example, from about 3% to about 10% of this type soap disperses in gasoline in from about 15 seconds to about 10 minutes and that gels having a suitable filtrate rate and viscosity are produced within from about 30 seconds to about 20 minutes.

I have found that from about 0.5% to about 10% by weight relative to the oily liquid of this hydroxy aluminum soap, preferably between about 3% and about 8%, produces a suitable gel for fracturing most formations in accordance with this invention. In general, higher proportions of the soap are required, the higher the average molecular weight of the hydrocarbon. Where the soap may be deteriorated as by weathering or contaminated as by moisture, it is sometimes desirable to use even more than 10%.

It is usually desirable to add the hard, granular material such as sand to increase the likelihood that the fracture will stay partly open, i. e., be propped open. However, successful treatments have been made when no such props were added. It may be that this was due to local spalling from the faces of the fracture; the exact reason is not known. The volume or weight of sand added is not critical; from no sand up to considerably above 10 pounds to the gallon of fracturing liquid can be used. Many wells have been fractured and have shown sustained increases in oil well production when using from 0.15 to 0.25 pound of sand per gallon. Although the size is not particularly critical, graded sand smaller than about 16-mesh is desirable. Sand passing through 20-mesh sieve and retained on 40-mesh sieve is preferred.

In accordance with the preferred embodiment of this invention, the oily liquid is weighed or otherwise measured and the soap and formation props are added in a tank as the liquid is stirred. As stated above, sometimes the liquid may be heated to advantage. If soap which reacts readily to produce a gel in the oily liquid is employed, a flow-type mixer may be used at the well head for the soap, the props, and the oily liquid. I have found that the gel will develop in the well. Therefore, since the more viscous gels are difficult to pump, the soap-liquid dispersion may be introduced into a well before the maximum gelation is reached. Accordingly, when the gelation has proceeded to a point at which the viscosity is sufficient to maintain substantially all the particles of undispersed soap in suspension, the dispersion, including props, can be pumped into the well. The gel may be pumped into the well and injected immediately into the formation or it may be allowed to stand in the well until the maximum gelation has developed, as indicated by a sample retained at the surface. By this means, high viscosity liquids are available for producing the fracture where such liquids would not be pumpable by normal pumps.

In any case, when substantially the maximum gelation of the hydrocarbon has been obtained, it is pumped into position in a well, preferably into a confined zone of a well where the fracture is to be produced, i. e., a zone in the well which has been isolated by one or more packers. When the low-penetrating oily liquid reaches the formation, due to its retarded tendency to filter through the formations, a substantial increase in pressure at the surface will be noted. The pressure rises after the viscous liquid or gel reaches the isolated formation until a rather abrupt break or leveling-off in the pressure versus pump rate curve occurs, indicating a formation fracture. If pumping continues at about the same rate, any amount of the low-penetrating oily liquid may be injected into the formation without a substantial increase in pressure. The maximum pressure at the formation is the pressure hereinafter referred to as the "formation breakdown pressure" and is approximately equivalent, expressed in pounds per square inch, to the depth of such formation, in feet. This pressure varies, however, from place to place, depending upon the depth and the nature of the formations, folding of the formations, and the like. A weighting material such as barytes, iron filings, iron oxide, or the like may be incorporated in the viscous liquid not only as a prop but to produce additional hydrostatic pressure at the formation. If sufficient weighting material is added, it is sometimes unnecessary to apply pump pressure to fracture a formation.

A filler fluid, i. e., an inert fluid such as crude oil or a refined oil such as gasoline or kerosene, which has no effect upon the gel, may be injected into the well after the injection of the viscous liquid to force the viscous liquid further into the formation.

Inasmuch as this gelled liquid tends to obstruct the flow of the interstitial fluids from the fractured formation into the well, it is removed therefrom after it has produced a fracture of suitable proportions. A peptizer or gel breaker may be incorporated in the gelled liquid and becomes effective after a time delay. For example, from about 1% to about 3% by volume of water, which becomes effective several hours after the gelled liquid has reached the fracture, may be incorporated in the gelled liquid, as, for example, by emulsification or the like. Likewise, other gel breakers which become effective at the temperature of the formation may be incorporated in the gelled liquid. The gel breaker may also be injected into the fracture zone prior to or after the viscous liquid. In some cases, particularly in deep wells, the heat from the formation is sufficient to reduce the viscosity or increase the filrate rate of the gel so that, without a second liquid, the fracturing liquid may be completely removed from the interstices of the formation.

Among suitable materials for breaking or peptizing the gel and reducing the viscosity of soap-hydrocarbon gels, I have found the water-soluble and oil-soluble amines such as ethanolamine, oleyl amine, or similar ammoniacal compounds and the oil-soluble sulfonates to be particularly effective. Other suitable gel breakers are ammonia, alkali oxides and hydroxides, and the stronger acids. For example, a 5% solution of hydrochloric, sulfuric, or acetic acid will break practically all 3% to 8% soap-hydrocarbon gels. Generally, about 1% to 6% breaker, typically 2% to 4%, based upon the volume of the fracturing liquid, diluted with a suitable solvent such as gasoline, is pumped into the well following the fracturing liquid to reduce the viscosity or break the gel so that when the well is produced the sol will flow out of the formation. More breaker is sometimes required, particularly where the soap content is high. The gel breaker solution may be injected into the formation in any amount, but normally a quantity between about ½ to about 5 times, preferably between about ½ and about 2½ times, the volume of the low-penetrating oily liquid is injected.

While, as indicated above, the breaker is preferably injected into the fracture through the well following the fracturing liquid, I have found that some of the gels, particularly those produced by the hydroxy aluminum soaps, may be broken by the interstitial fluids in most formations. Breaking the gel by this means is necessarily slow, since the gel must be adapted to withstand the peptization effect of the gel breaker for sufficient time to permit placement of the gel. Thus, while it is not generally desirable to break the gel by the action of the interstitial fluids, due to the necessary delay, such procedure is within the purview of this invention.

As pointed out above, props, preferably sand, or similar strong, cheap, granular materials, are incorporated in the viscous liquid either during mixing or during the time it is being injected into the well. These props, due to the high suspending forces of the viscous liquid, are carried into the formation fracture with the viscous liquid. Since these liquids have only a temporary high viscosity, i. e., since this high viscosity is subsequently broken in the fracture, the props are deposited in the fracture and held there by the formation as the fracture is collapsed so there is no tendency for the props to flow back into the well as the well is produced and as the sol flows back into the well.

As an example of the effect of my invention on the operation of a Woodbine sand well, a well in the East Texas Field, which on a production test prior to treatment in accordance with my invention produced less than 1 barrel of oil per day with no water, was treated as follows:

The well had 3505 feet of 2-inch tubing with a formation packer located on the bottom. Total depth of the well was 3551 feet, and the open hole between the packer and total depth was 4¾ inch diameter. A fracturing liquid was made up by adding 6% (by weight) of hydroxy aluminum soap, as above described in the preferred embodiment, to 23 barrels of East Texas crude oil. The soap was added to the crude oil while the crude oil was agitated. The crude oil was at a temperature of about 73° F. Agitation was continued for an hour, at which time the viscosity was approximately 200 centipoises on the Stormer viscosimeter operating at 600 R. P. M. The filtrate rate of the low-pentrating oily liquid was about 20 cc. in 30 minutes. When the viscosity of the fracturing liquid reached 200 centipoises, injection into the well at the rate of 4.68 barrels per minute was started with 160 lbs. of 16-mesh screened plaster sand being mixed into the fracturing liquid at the pump suction at a uniform rate of about 0.15 lb. of sand per gallon of the liquid. After the fracturing liquid had been injected into the tubing, it was followed immediately by two barrels of East Texas crude oil for the purpose of separating or spacing the fracturing liquid from the gel breaker which then followed immediately at substantially the same injection rate. This gel breaker, which had been compounded before injection of the fracturing liquid started, consisted of 24 barrels of gasoline containing 35 gallons of 60% oil-soluble sulfonates and 40% aromatic petroleum solvents. Immediately following the gel breaker solution, 25 additional barrels of East Texas crude oil were pumped into the well to displace the gel breaker from the tubing and the well into the formation. The formation breakdown pressure was approximately 3400 p. s. i., and the pressure dropped thereafter to the effective overburden pressure which was approximately 2700 p. s. i. After the crude oil was injected, the well was allowed to stand idle for 48 hours to permit a substantial reduction in the viscosity of the fracturing liquid. On a production test which followed immediately, the well pumped about 5 centipoises crude oil at the rate of approximately 70 barrels per day. Inasmuch as 122 barrels of fluid had been pumped into the well, the initial production obviously included the injected liquids. However, the sustained production (pumping) was at the rate of 50 barrels of oil per day with no water. Examples of other successful treatments are given in Table I:

*Table I*

| Field | Depth to Zone of Fracture | Formation Breakdown Pressure, p. s. i. | Gallons of Fracturing Liquid | Production Bbl. per day— | |
|---|---|---|---|---|---|
| | | | | Before | After |
| Frannie Field, Wyoming. | 3,025–3,146 | 1,850 | 900 | 60 | 160 |
| E. Sasakwa Field, Oklahoma. | 2,717–2,752 | 2,050 | 1,000 | 0 | 0 |
| Rangely Field, Colorado. | 5,890–6,250 | 4,900 | 800 | 75 | 140 |

In these wells, the volume of gel breaker used was roughly twice the volume of fracturing fluid. Sand was used at the rate of 0.15 to 0.2 pound of 16-mesh sand per gallon of fracturing fluid. Packers were used to confine the length of zone of open hole to which the hydraulic pressure was applied to the figures given.

While I have described my invention by reference to specific embodiments, it will be apparent that it is susceptible of a great variety of embodiments and therefore the invention is not to be construed to be limited by the above description. It is defined best by the appended claims.

Certain subject matter disclosed herein is claimed in Farris application Serial No. 136,395, filed December 31, 1949, as a continuation-in-part of abandoned Farris application Serial No. 29,922, filed May 28, 1948.

I claim:

1. A method of increasing the productivity of a formation penetrated by a well through fracturing the formation, which comprises introducing into said well a fracturing medium containing as essential constituents a low-viscosity hydrocarbon liquid and a hydroxy aluminum soap gel-forming material, said soap being in sufficient amount when mixed with said liquid to produce a fracturing medium possessing a viscosity of at least about 200 centipoises, pumping said fracturing medium into a confined zone in said well adjacent said formation, pumping additional liquid into said well after said fracturing medium, until a fracture in said formation is indicated said additional liquid including a gel breaker for said fracturing medium, continuing pumping liquid into said well to displace at least part of said fracturing medium and at least part of said gel breaker into said fracture, whereby the viscosity of said fracturing medium is substantially reduced, and thereafter producing said well.

2. The method of increasing the fluid productivity of a formation penetrated by a well, which method comprises introducing into the well a pumpable fracturing medium compatible with said fluid, said medium comprising a low-viscosity hydrocarbon liquid and between about 3 and about 8 per cent of a mixture of an aluminum soap of a saturated fatty acid containing at least 40 to 50 per cent of aluminum laurate and an aluminum soap of a second acid selected from the group consisting of cycloparaffinic and unsaturated acids, sufficient to effect gelation of said liquid, whereby said medium is converted into a low-penetrating oily pumpable gel having a viscosity greater than 30 centipoises and a dehydration time of at least one and one-half minutes in the apparatus described in A. P. I. Code No. 29, second edition, July 1942 (tentative) where dehydration time is defined as the time required to filter 600 cc. of said gel at 100 p. s. i. pressure differential, pumping said fracturing medium into the well as a column until a part thereof is in contact with the formation, pumping additional fluid into the well at a rate sufficient to increase the pressure exerted at the formation until a formation fracture is indicated by a decrease in the pressure at the pump discharge while pumping at an undiminished rate, continuing the pumping after indication of the fracture to displace at least a part of the fracturing medium from the column into passages formed in the formation, contacting said gel and a gel breaker therefor in an amount and for a time sufficient to reduce substantially the viscosity of the liquid in said passages and thereby prevent clogging of said passages, and withdrawing the liquid of reduced viscosity from the passages by removing liquids from said well.

3. The method of claim 2 wherein the liquid is crude oil and the amount of soaps is at least 3 per cent by weight based on said liquid.

4. The method of claim 2 wherein the liquid is composed of hydrocarbons boiling in the gasoline to diesel oil boiling range and the amount of soaps is in the range of about 3–8 per cent by weight based on said liquid.

5. The method of claim 2 wherein about 1 to about 3 per cent by volume of water based on fracturing medium is employed as the gel breaker.

6. The method of claim 5 wherein said amount of water is introduced into said fracturing medium prior to its introduction into said well.

7. The method of claim 2 wherein said gel breaker is interstitial liquid in the formation.

8. The method of claim 2 wherein the gel breaker is an amine.

9. The method of claim 2 wherein the gel breaker is a strong acid.

10. The method of claim 2 wherein the gel breaker is an oil-soluble sulfonate.

11. The method of claim 2 in which the soaps and the liquid are mixed before introducing said liquid into the well.

12. The method of claim 11 which includes the steps of mixing the soaps with the liquid until gelation has proceeded to a point at which sand particles can be suspended in the resulting gel, and suspending sand particles in said gel before introducing said gel into the well, whereby said sand particles are carried by said gel into said passages and deposited therein when said gel is broken by said gel breaker.

13. The method of claim 2 wherein the fracturing medium comprising soaps and hydrocarbon liquid is introduced into the well before maximum gelation is effected, whereby gelation of said fracturing medium continues in said well.

14. The method of increasing the fluid productivity of a formation penetrated by a well, which method comprises isolating a portion of the well adjacent said formation by at least one packer set on the well tubing, preparing a fracturing medium by adding to a low-viscosity hydrocarbon oil about 3–8 per cent by weight of a mixture of soaps comprising aluminum oleate and aluminum coconut oil fatty acid soaps in such proportions as to effect gelation at atmospheric temperatures of at least about 75° F., agitating the oil-soap mixture until gelation is effected to such an extent that the resulting gel will suspend particles of sand of about 20 to about 40 mesh, adding to the partially gelled mixture from about 0.1 to about 10 pounds of sand per gallon and injecting the sand-containing gel into the tubing, pumping into the tubing above the fracturing medium a gel-breaker liquid, pumping into the tubing above the gel-breaker liquid a large quantity of crude oil, continuing the pumping of liquid into the well until a substantial increase in pressure at the surface is noted indicating that the gel has reached the isolated portion of the formation, continuing the pumping until there is a decrease in pump-discharge pressure without substantial diminution in pumping rate, thus indicating a formation fracture, further continuing the pumping of liquid into the formation to enlarge channels formed therein, thereby carrying sand into said channels and eventually carrying gel breaker into said channels, then discontinuing the pumping and allowing the well to stand idle for a period of hours to permit reversion of the gel to a low-viscosity liquid by gel breaker associated therewith in said channels and deposition of the sand in said channels, and finally producing well fluids from said isolated section to effect removal of the reverted gel from the channels.

15. The method of increasing the fluid productivity of a formation penetrated by a well, which method comprises isolating a portion of the well adjacent said formation by at least one packer set on the well tubing, preparing a fracturing medium by adding a low-viscosity hydrocarbon oil about 3 to 8 per cent by weight of a mixture of an aluminum soap of coconut oil fatty acids and an aluminum soap of fatty acids selected from the group consisting of cycloparaffinic and unsaturated fatty acids, and thereby forming a dispersion capable of effecting gelation at atmospheric temperatures of at least about 75° F., agitating the oil-soap mixture until gelation is effected to such an extent that the resulting gel will suspend particles of sand of about 20 to about 40 mesh, adding to the partially gelled mixture from about 0.1 to about 10 pounds of sand per gallon and injecting the sand-containing gel into the tubing, pumping into the tubing above the fracturing medium a gel-breaker liquid, pumping into the tubing above the gel-breaker liquid a large quantity of oil, continuing the pumping of liquid into the well until a substantial increase in pressure at the surface is noted indicating that the gel has reached the isolated portion of the formation, continuing the pumping until there is a decrease in the resistance to flow of said gel which indicates a formation fracture, further continuing the pumping of liquid into the formation to enlarge channels formed therein, thereby carrying sand into said channels and eventually carrying gel breaker into said channels, then discontinuing the pumping and allowing the well to stand idle for a period of hours to permit reversion of the gel to a low-viscosity liquid by gel breaker associated therewith in said channels and deposition of the sand in said channels, and finally producing well fluids from said isolated section to effect removal of the reverted gel from the channels.

16. The method of increasing the fluid productivity of a formation penetrated by a well comprising the steps of introducing into the well a fracturing medium comprising a low-viscosity hydrocarbon oil and from about 3 to about 8 per cent by weight of a mixture of an aluminum soap of saturated fatty acids and an aluminum soap of a fatty acid selected from the group consisting of cycloparaffinic and unsaturated fatty acids, thereby forming a dispersion capable of effecting gelation at temperatures of at least about 75° F., agitating the oil-soap mixture until it is partially gelled to such an extent that will suspend particles of sand of about 20 to about 40 mesh, adding to the partially gelled mixture from about 0.1 to about 10 pounds per gallon of sand of about 20 to 40 mesh, disposing a quantity of said partially gelled mixture with said sand suspended therein within a confined zone in said well adjacent said formation, retaining said quantity in said confined zone, whereby increased gelation developes, applying to said quantity a pressure sufficient to fracture said formation and inject at least a part of said gel and said sand into passages formed in said formation, contacting said gel and a breaker therefor to cause a reduction in the viscosity of said gel in said passages and resolution of said gel into a relatively low-viscosity liquid whereby said relatively low-viscosity liquid will be removed from said well when liquids are produced from said well.

17. A method of increasing the productivity of a formation penetrated by a well comprising the steps of mixing at the well head a hydrocarbon liquid and an aluminum soap gelling agent for said liquid in sufficient proportion to form a low-penetrating gel which is capable of breaking on prolonged contact with intersticial liquid, pumping this mixture into said well, forcing said mixture down said well during gelation of said mixture, whereby a more viscous gel may be positioned in a confined zone adjacent said formation than could be readily pumped, increasing the pressure on said gel until a formation fracture is indicated, continuing application of high pressure to force a portion of said gel into said fracture, and producing fluids from said well only after maintaining said gel in said fracture for a time sufficient to break and reduce substantially the viscosity of said gel.

18. The method of claim 17 which includes the step of adding granular spacer material insoluble in well fluids with at least a portion of the liquid introduced into the well whereby said spaced material may be carried by the gel into the formation fracture and deposited in said fracture when the gel is broken.

19. A method according to claim 17 wherein said aluminum soap gelling agent is a hydroxy aluminum soap gelling agent.

20. The method of claim 17 wherein the hydrocarbon liquid is crude oil and the amount of aluminum soap gelling agent is at least 3 percent by weight based on the weight of said hydrocarbon liquid.

21. The method of claim 17 wherein the hydrocarbon liquid is composed of hydrocarbons boiling in the gasoline to diesel oil boiling range and the amount of gelling agent is in the range of about 3-8 percent by weight based on said hydrocarbon liquid.

22. The method of claim 17 which includes the step of introducing a gel breaker through said well into said fracture to expedite the breaking of said gel.

23. A method of claim 22 wherein said gel breaker comprises between about 1 and about 3 percent by volume of water based upon the volume of said gel.

JOSEPH B. CLARK.

REFERENCES CITED

The following references are of record in the file of this patent:

UNITED STATES PATENTS

| Number | Name | Date |
| --- | --- | --- |
| 2,264,353 | Zimmer et al. | Dec. 2, 1941 |
| 2,300,325 | Leeuwen | Oct. 27, 1942 |
| 2,332,822 | Williams | Oct. 26, 1943 |
| 2,354,570 | Benckenstein | July 25, 1944 |
| 2,379,516 | Garrison | July 3, 1945 |
| 2,380,893 | Zimmer et al. | July 31, 1945 |
| 2,390,609 | Minich | Dec. 11, 1945 |
| 2,447,064 | Gebhart et al. | Aug. 17, 1948 |
| 2,458,034 | Swenson et al. | Jan. 4, 1949 |
| 2,477,296 | Georgi | July 26, 1949 |
| 2,491,641 | Bondi | Dec. 20, 1949 |

OTHER REFERENCES

Torrey, P. D.: "Selective Exclusion of Fluids from Wells," The Oil Weekly, pages 26 to 35, May 22, 1939.

"Napalm," Fieser et al. Industrial and Eng. Chem., vol. 38, No. 8, Aug. 1946, pp. 768-773.